United States Patent [19]

Keyes

[11] 4,088,266
[45] May 9, 1978

[54] METHOD AND APPARATUS FOR COLLECTING, STORING AND TRANSMITTING SOLAR HEAT

[75] Inventor: John H. Keyes, Nederland, Colo.

[73] Assignee: International Solarthermics Corporation, Nederland, Colo.

[21] Appl. No.: 699,529

[22] Filed: Jun. 24, 1976

[51] Int. Cl.² ............................................. F24J 3/02
[52] U.S. Cl. .................................... 237/1 A; 126/270; 126/400
[58] Field of Search ................. 237/1 A; 126/270, 271, 126/400

[56] References Cited

U.S. PATENT DOCUMENTS

| 965,391 | 7/1910 | Little | 126/270 |
|---|---|---|---|
| 2,167,576 | 7/1939 | Kiser | 126/271 |
| 3,089,670 | 5/1963 | Johnson | 126/270 |
| 3,863,621 | 2/1975 | Schoenfelder | 237/1 A |
| 3,946,721 | 3/1976 | Keyes et al. | 126/270 |
| 3,997,108 | 12/1976 | Mason | 237/1 A |
| 4,026,273 | 5/1977 | Parker | 126/271 |

Primary Examiner—John J. Camby
Assistant Examiner—Henry C. Yuen
Attorney, Agent, or Firm—Gary M. Polumbus

[57] ABSTRACT

A self-contained apparatus for collecting, storing and transmitting solar heat includes an elongated rectangular insulated housing in which a quantity of heat retaining material is confined and a collector on the horizontal and vertical faces of the housing which has only one layer of glass for each face through which solar heat may pass and be collected upon a heat-collecting surface. A conditioning pump is provided within the apparatus to circulate conditioning air through both the collector and the heat retaining material within the housing so that heat is transferred from the collector to the heat retaining material. Specially designed and positioned ducts connect the collector to the interior of the housing in a manner such that air interchange between the collector and the interior of the housing is prevented except during operation of the conditioning pump. Both the collector and the interior of the housing are provided with appropriately positioned baffles to expose the conditioning air to all of the heat retaining material. Utility pump means are also provided in the apparatus for withdrawing heat from the heat retaining material and circulating it through a remote building structure.

26 Claims, 11 Drawing Figures

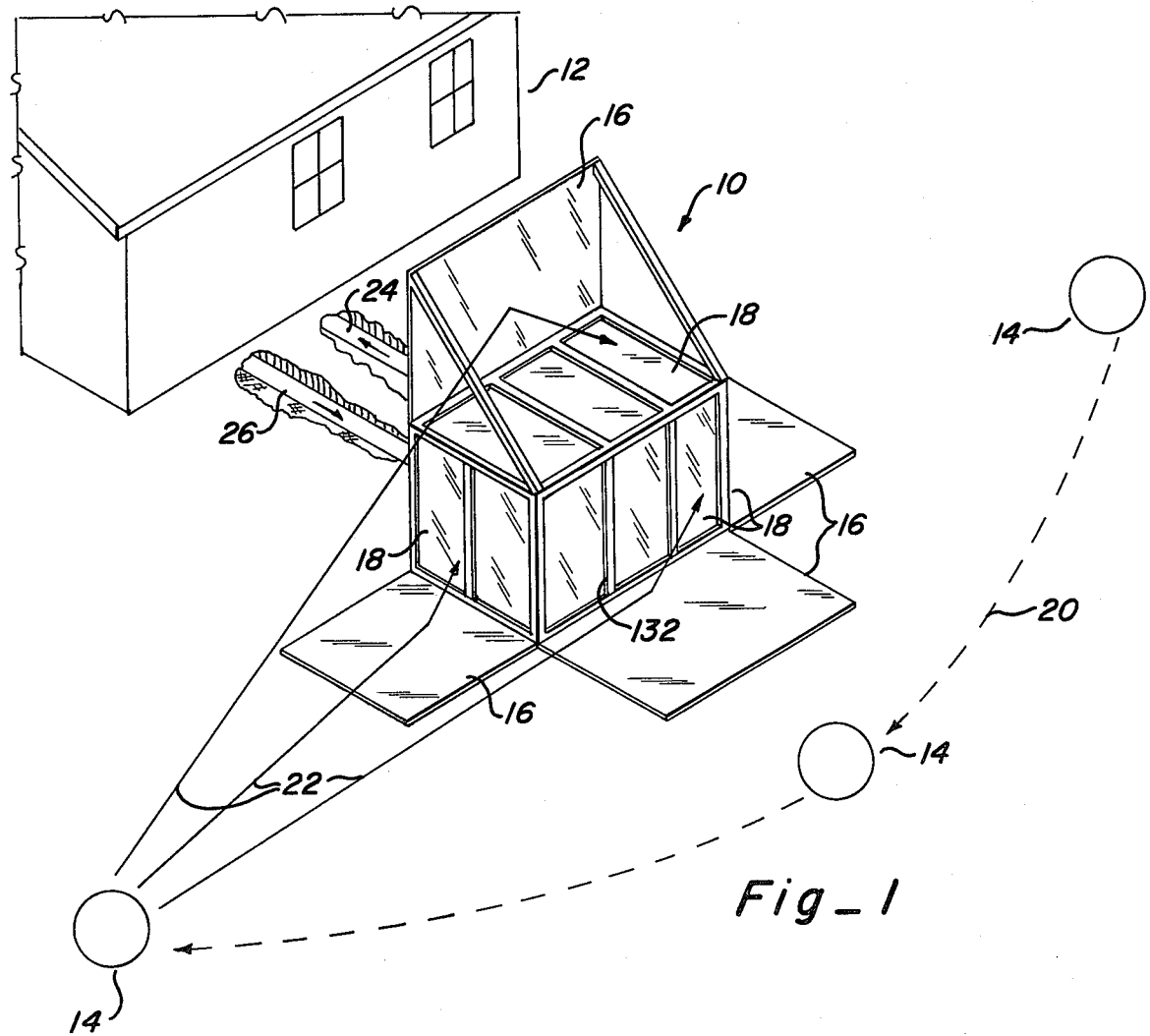
Fig_1
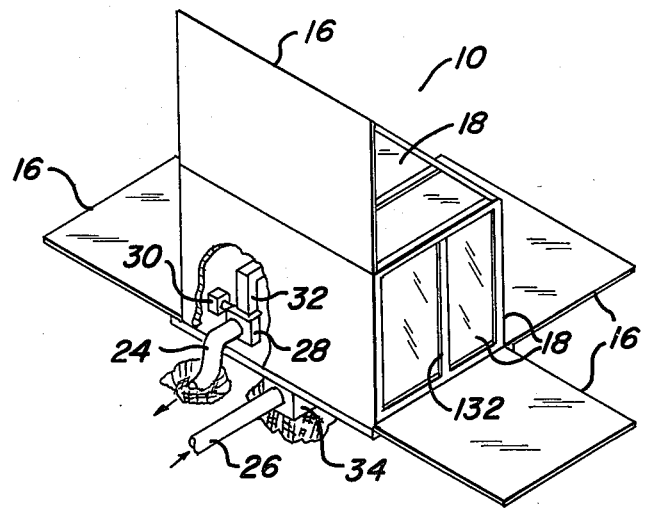
Fig_2

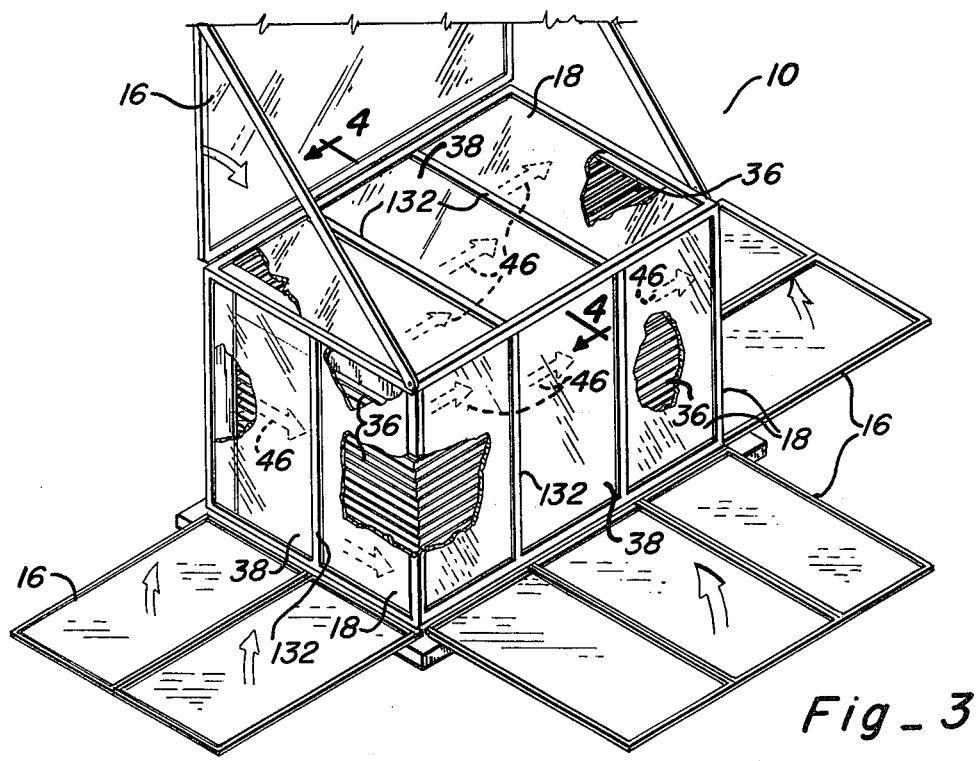
Fig_3
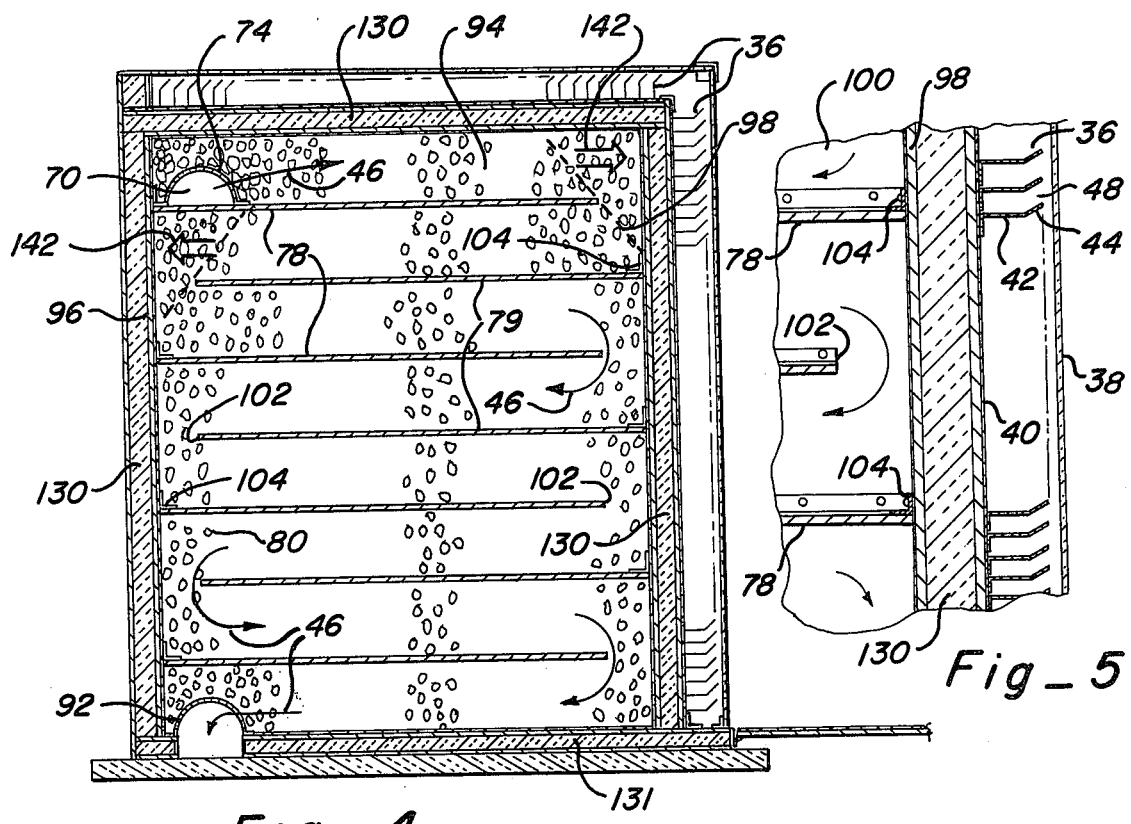
Fig_4
Fig_5

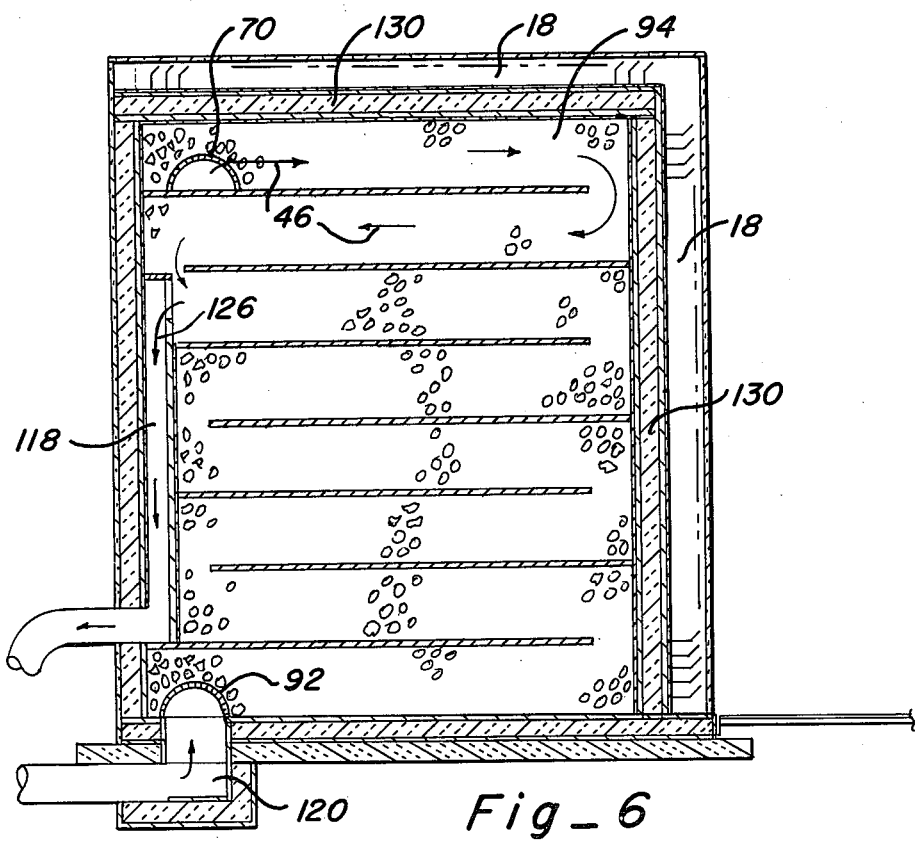
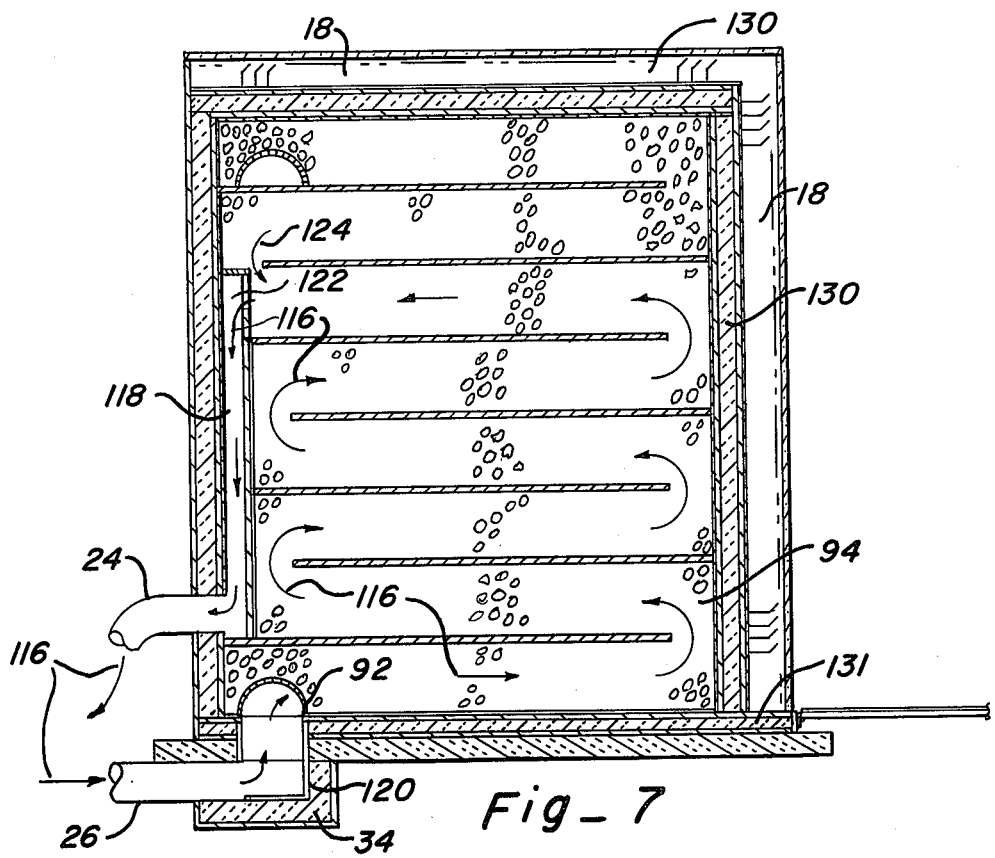

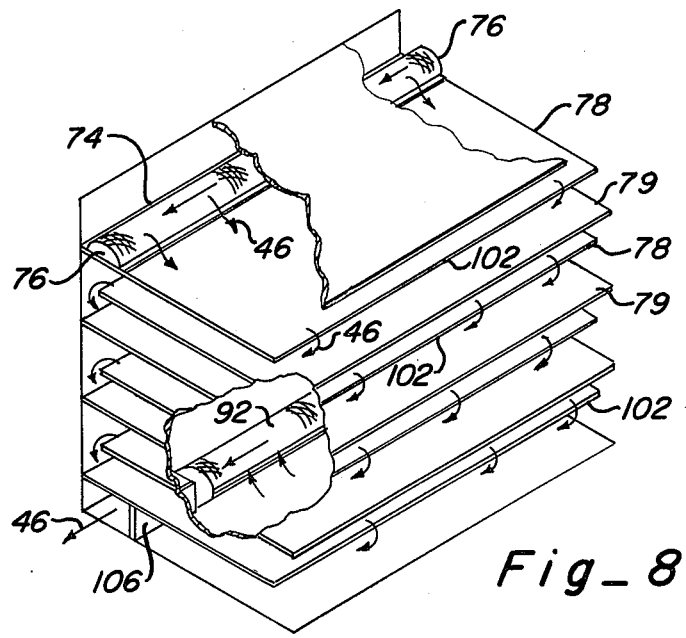
Fig_8
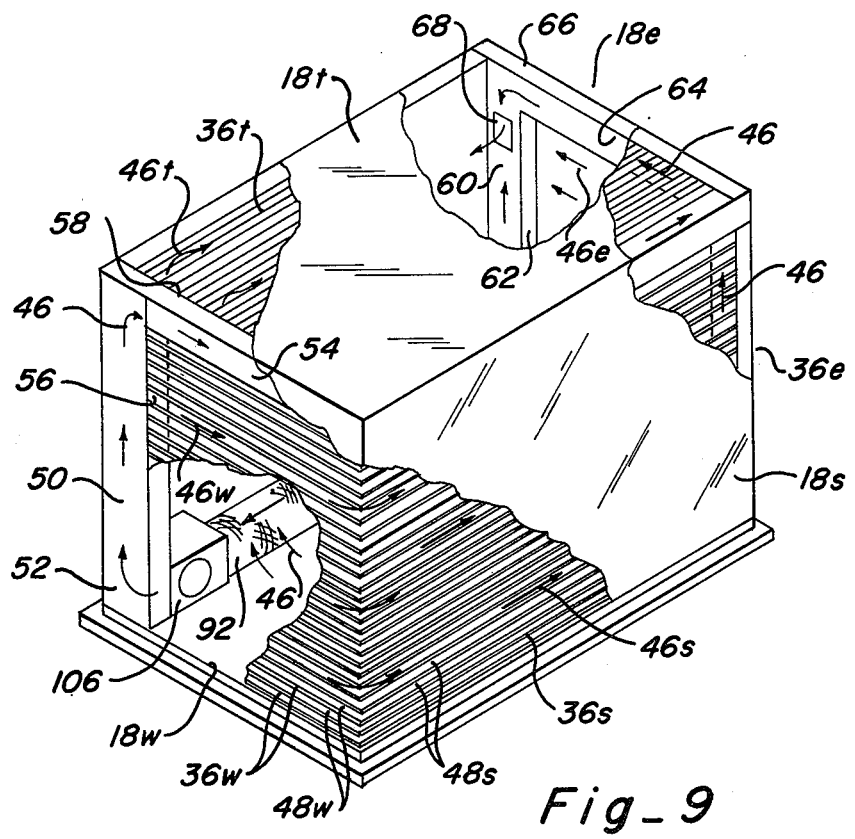
Fig_9

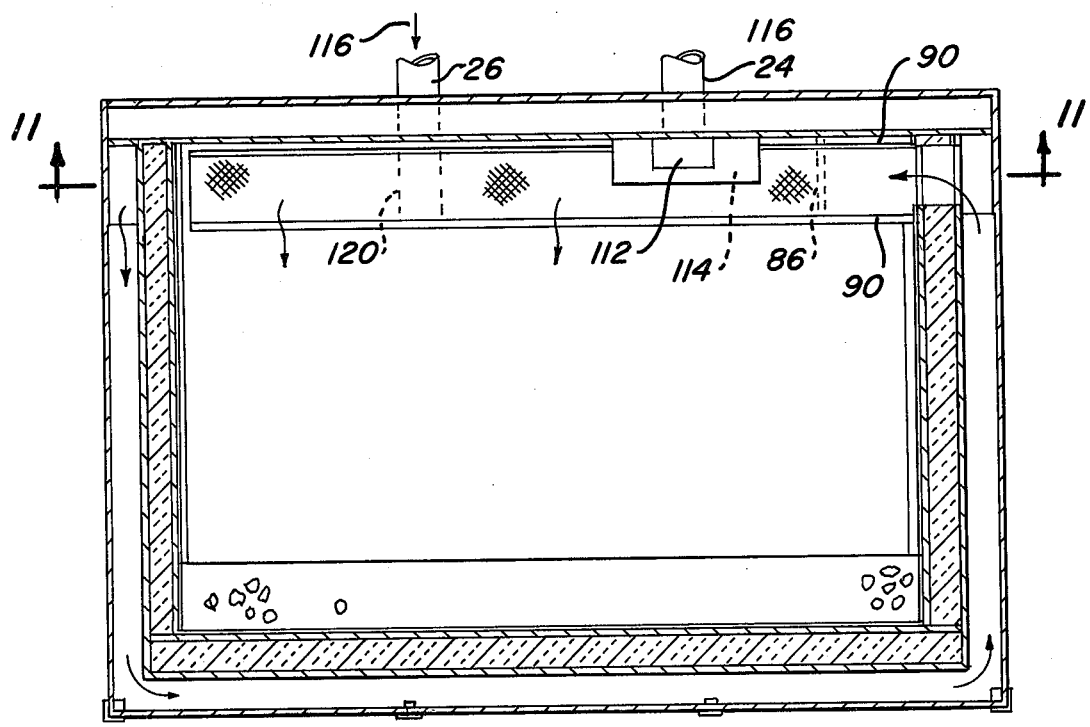
Fig_10
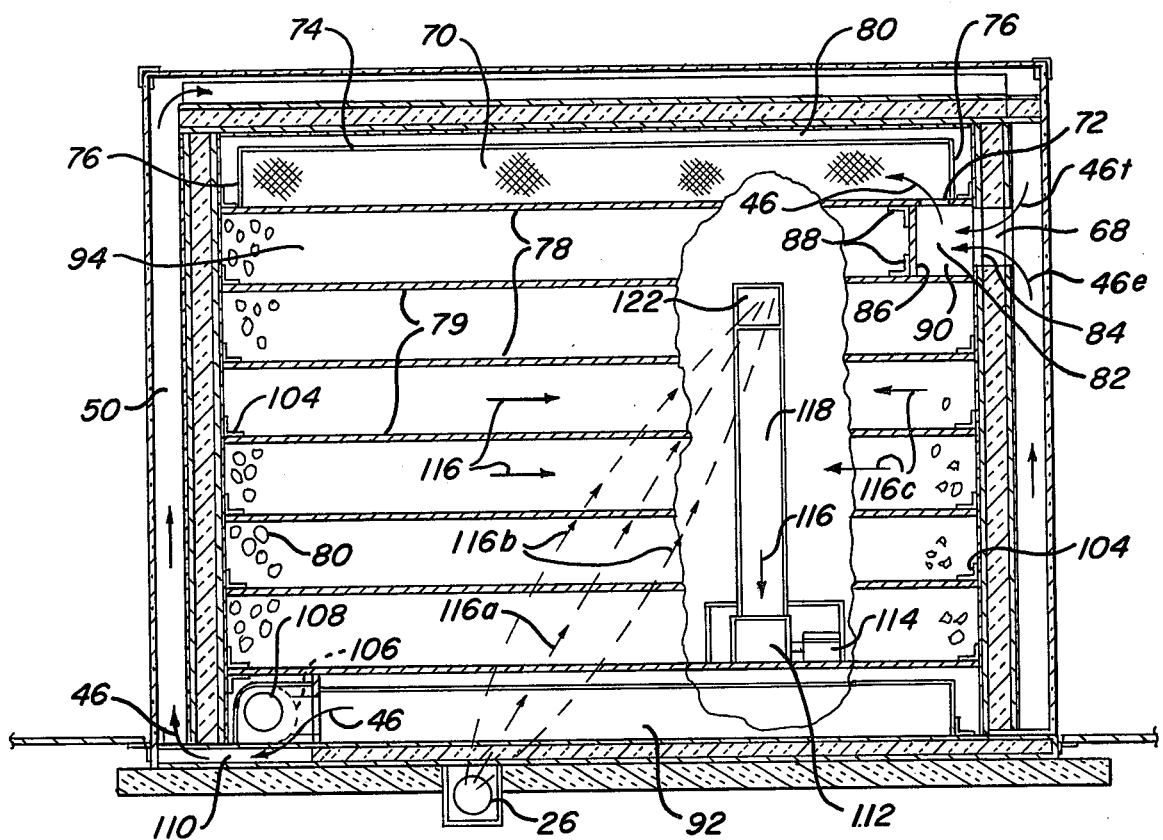
Fig_11

METHOD AND APPARATUS FOR COLLECTING, STORING AND TRANSMITTING SOLAR HEAT

BACKGROUND OF THE INVENTION

1. Field of the Invention

The present invention relates generally to a method and apparatus for collecting, storing and transmitting solar heat and more particularly to a method and apparatus for heating building structures and the like.

2. Description of the Prior Art

Numerous prior art solar furnaces have attempted to efficiently harness the enormous energy outlet of the sun. With the impending fossil fuel shortage, a highly efficient solar furnace adaptable to conventional forced air heating systems would find widespread use. Prior art solar furnaces, however, are generally typified by extremely large and expensive collector plates covering large portions of the roof or surface area of the building to be heated and are further typified by extremely large storage chambers usually located in the substructure of the building. Prior art arrangements have utilized either an air or a liquid heat transfer medium from the roof collector to the substructure storage chamber. The heat transferred to the storage chamber is stored for later circulation through the building structure by a separate air or fluid flow.

Such prior art arrangements have proven to be significantly more expensive than corresponding fossil fuel heating systems. Furthermore, these prior art solar furnaces have not efficiently collected, transferred or stored the heat generated by the sun. The heat finally used for heating the building has conventionally been only a few per cent of the total solar heat available for use. Additionally, these prior art systems have not been capable of being easily installed in existing building structures and have not been devised to cooperate as an auxiliary heating unit to the conventional forced air heating systems commonly found in building structures. Finally, these prior art arrangements generally do not aesthetically blend into existing building structures.

Typical examples of prior art solar heating systems may be found in the June, 1973 and October, 1973 issues of Popular Mechanics magazine and in the May, 1973 issue of Popular Science magazine.

A major improvement to prior art solar furnace arrangements is found in co-pending application Ser. No. 445,473 now U.S. Pat. No. 3,987,786, of common ownership with the present application and entitled "METHOD AND APPARATUS FOR COLLECTING, STORING AND TRANSMITTING SOLAR HEAT", now through division, U.S. Pat. Nos. 3,946,944, 3,894,685 and 3,946,721. This application discloses an economical solar furnace which does not need to be integrated into the building structure and which is adaptable to supplement conventional forced air heating systems. In co-pending application Ser. No. 515,230, now U.S. Pat. 3,946,720, also of common ownership with the present application and entitled "SOLAR HEAT COLLECTING UNITS" an improved solar heat collecting unit is disclosed which enables efficient trapping of almost all solar radiation, direct or indirect.

OBJECTS OF THE INVENTION

The present invention has for its primary object the provision of a new and improved method and apparatus for collecting, storing and transmitting solar heat.

It is another object of the present invention to provide a compact, self-contained solar heating unit which can be positioned exteriorly of a building structure and with minimum time and expense connect to the building structure so as to convert solar radiation into heat for maintaining a desired temperature within the building structure.

It is another object of the present invention to provide a new and improved solar heating system which is readily connected into an existing forced air heating system so as to serve as an auxiliary system with minimal alterations to an existing building structure.

It is another object of the present invention to provide a solar heating unit which utilizes a small and compact heat collector yet provides the capacity for adequately heating typical residential and office building structures.

It is another object of the present invention to provide a solar heating apparatus having a plurality of reflective panels to increase the intensity of solar radiation on the collector and which can also serve as a protective covering for the collector portion of the apparatus in inclement weather conditions.

It is another object of the present invention to provide a hot air solar furnace in which baffle members are positioned within the heat storage chamber to desirably circulate air to obtain optimum heat storage within the unit.

It is another object of the present invention to provide a hot air solar furnace in which the solar collector surface not only efficiently collects direct solar radiation, but also collects indirect or diffuse radiation whereby the solar furnace can be oriented in any direction, as well as at any angle relative to horizontal or vertical and still collect useful solar radiation.

It is another object of the present invention to provide a solar furnace in which heat is transferred from the collector surface to heat retaining material with a minimum of heat loss and, then, to remove the heat from the heat retaining material for transmittal into a nearby building structure with a minimum of heat loss.

It is another object of the present invention to provide a hot air solar furnace which has above ground heat storage eliminating the need for costly and disfiguring excavation.

It is another object of the present invention to provide means to containerize heat storage with a new and simplified framing technique that maximizes the amount of heat retaining material stored therein.

It is another object of the present invention to provide a hot air solar furnace which has at least one substantially vertical or at least one substantially horizontal solar collector surface.

It is another object of the present invention to provide a hot air solar furnace which positions the storage chamber within vertical side walls and a horizontal top wall wherein the outer surface of these walls combined comprise the collector surface.

It is another object of the present invention to provide a solar heating apparatus having a solar heat collector utilizing a single glass panel for separating the collector surface from the ambient environment.

SUMMARY OF THE INVENTION

The foregoing and other objects of the present invention are obtained with a self-contained apparatus for collecting, storing and transmitting solar heat to and from a building or house. The solar apparatus includes a central area of heat retaining material for storing solar heat, a plurality of collector units located on the sides of the heat retaining material for absorbing heat from solar radiation, reflector panels pivotally mounted over the collectors for selectively directing additional solar radiation into the collectors, and fluid pumps for conveying the heat from the collectors into the heat retaining material and for conveying the heat from the material into a building or house.

In operation, the reflector panels may be closed at night to retain the heat from the sun and then opened during the day for capturing heat for the winter months and may be opened at night to release heat obtained from the house, and closed during the day for the summer months. The solar apparatus of the present invention, therefore, acts both as a heater during the winter and as an air conditioner during the summer. The front end reflector panel when opened will primarily collect the solar heat during the morning, the top and side panels will primarily trap direct solar radiation during the day, and the opposite end panel will primarily capture direct solar radiation as the sun is in the setting position. All collectors will capture indirect solar radiation throughout the day.

The collector units absorb and retain the solar radiated heat. Air is circulated through the collector units and into the storage chamber containing the heat retaining material. After passing through the heat retaining material, the air is recirculated through the collector so as to continuously transfer heat, when desired, from the collector to the storage chamber. For purposes of the present disclosure, this recirculating air will be referred to as conditioning air. A series of baffles located within the storage chamber and separating the heat retaining material directs the conditioning air throughout the entire quantity of heat retaining material in the storage chamber.

Reflector panels are hinged to the framework of the housing in order to increase the intensity of the solar heat radiation being absorbed by the collector unit. Each collector unit panel has a corresponding hinged reflective panel such that the two ends and the front side collector panels have reflective panels that open outward to the ground being hinged along the framework of the housing nearest the ground. A fourth reflector panel is pivotally hinged to the top end of the rear side panel of the housing which does not contain a collector unit and it opens outward toward the rear side panel so that solar radiation is reflected into the top collector unit. These reflective panels are designed so that in closed position each collector unit is covered and completely protected from detrimental environmental elements such as hail, sunlight in summer months, and the like.

The heat retained by the heat retaining material in the storage chamber is transferred into an adjacent building structure or the like by a utility pump which may be positioned within the storage chamber for selectively distributing the heated air through the building structure. This air flow, hereinafter referred to as the utility air flow, is circulated back through the storage chamber in a manner such that the utility air is not short circuited and directed through the collector with the conditioning air unless both pumps are operating simultaneously. In case both the utility pumps and the conditioning pump are operating simultaneously, the hot air from the collector units is primarily directly transferred into the utility air circulation and by-passes the heat retaining material. This air flow will be hereinafter referred to as the hot utility air flow.

According to the method of the present invention, heat is first absorbed from the sun on several collector surfaces wherein each collector surface is insulated from the ambient environment. Conditioning air is passed across the collector surface in order to deliver the absorbed solar heat into the storage chamber in order to transfer the heated air to the heat retaining material. The heat retained by the material in the storage chamber is transferred into a building structure by directing the utility air through the heat retaining material and into the building structure where it is distributed as desired throughout the structure.

Other objects, advantages and capabilities of the present invention will become more apparent as the description proceeds taken into conjunction with the accompanying drawing.

DESCRIPTION OF THE DRAWING

FIG. 1 is a perspective view of the solar heating apparatus of the present invention with the reflector panels shown in the open position.

FIG. 2 is a perspective view of the solar furnace as viewed from the reverse side of FIG. 1.

FIG. 3 is a perspective view of the solar heating apparatus of the present invention with portions of glass cut away to show the heat collecting units.

FIG. 4 is a section taken along line 4–4 of FIG. 3 to illustrate the interior of the storage chamber.

FIG. 5 is an enlarged fragmentary section illustrating the connections of the solar heat collecting plates and of the baffles to a side panel.

FIG. 6 is a pictorial representation of the interior of the storage chamber illustrating the flow of hot utility air through the heat retaining material.

FIG. 7 is a pictorial representation of the interior of the storage chamber illustrating the flow of utility air through the heat retaining material.

FIG. 8 is a perspective pictorial representation of the alternating baffles within the storage chamber.

FIG. 9 is a diagrammatic perspective view of the collecting units of the present invention with cut-aways illustrating the flow of the conditioning air.

FIG. 10 is a top elevation of the solar heating apparatus of FIG. 1.

FIG. 11 is a section along line 11–11 of FIG. 10 with a cut-away showing the vertical delivery duct for the utility air flow.

GENERAL DESCRIPTION

FIG. 1 shows the solar heating apparatus 10 of the present invention oriented longitudinally on an east-west axis in spaced relation to a building structure 12 such that the solar heating apparatus 10 is positioned to receive maximum solar radiation from the sun 14. Reflective panels 16 are positioned to increase the amount of solar radiation directed at collector units 18.

It is evident that as the sun 14 traverses its daily passage 20 of rising in the east, progressing to a noontime position and setting in the west, the solar furnace 10 is able to collect solar radiation throughout the entire day. This is true even though the sun 14 as it moves across its daily path 20 constantly changes its angle of interaction with the fixedly positioned solar furnace 10. This is due primarily to the specific design of the collector units 18 which are fully discussed and incorporated into this application by the reference to the aforementioned application Ser. No. 515,230 for "Solar Heat Collecting Units".

The reflective panels 16 define flat reflective surfaces, preferably of a metallic material which is not readily susceptible to breakage, with the metallic material being backed by plywood or the like which forms an outer protective covering for the apparatus when the panels are folded into face-to-face protective relationship with the collector units 18.

With the reflective panels 16 defining flat reflective surfaces, a setting western sun 14, as shown in FIG. 1, would cause solar radiation to be concentrated in all four collector units 18 of the solar furnace 10 as shown by descriptive solar rays 22. It is apparent that the total surface area collecting solar radiation is quite extensive over conventional approaches.

The solar furnace 10 delivers heated utility air into the adjoining building structure 12 in a manner substantially as discussed in the aforementioned application Ser. No. 445,473 now U.S. Pat. No. 3,987,786, which is hereby incorporated by reference. As more fully described in application Ser. No. 445,473, now U.S. Pat. No. 3,987,786, the heated utility air of the present invention is delivered to a conventional forced air furnace system, not shown, that is modified to receive an alternate source of hot air through an above ground delivery pipe 24. After the utility air is circulated through the house it returns through a buried return pipe 26 into the solar furnace 10 where it is circulated through the furnace, heated, and then delivered back into the house 12 through delivery pipe 24.

As shown in FIG. 2, the utility air is forced into the delivery pipe 24 by a blower 28 which is driven by a motor 30. The blower 28 forces the utility air from a delivery duct 32 into the delivery pipe 24, through the conventional hot air heating system of building 12, back into the return pipe 26, and into a return housing 34 beneath the solar furnace 10.

DETAILED DESCRIPTION

Three basic air flows can be present in the solar furnace 10. The first is the flow of conditioning air which becomes heated as it flows through the solar heat collecting units 18 and which then becomes cool as it delivers the heat to a storage medium within the interior of the solor furnace 10. The second is the flow of utility air which transfers the heat stored in the storage medium into the building 12. Conditioning air flow and utility air flow operate independently of each other and are driven by separate air blowers. In practice, the conditioning air flow operates to bring the solar furnace 10 up to temperature and then the conditioning air flow and the utility air flow are operated alternately to maintain the building 12 and the furnace 10 at constant temperature. Hot utility air flow is possible by operating the conditioning air blower and the utility air blower simultaneously. Hot utility air flow delivers heat directly from the collecting units 18 to the building 12. Each type of air flow will be discussed in detail hereinafter.

Conditioning Air Flow

FIG. 3 shows the solar furnace 10 with reflective panels 16 fully open and responsive to solar radiation input for directing the radiation to the collecting units. As solar radiation is directed into the collector units 18 either directly from the sun or indirectly from the reflective panels 16 or elsewhere, the solar radiation is trapped in collecting plates 36 located behind a single layer of glass 38. The structure and use of such collecting plates 36 are fully disclosed in the aforementioned copending application for solar heat collecting units, Ser. No. 515,230.

The collecting plates 36, best shown in FIG. 5, are adapted to be mounted upon a support surface 40 so that an inner plate portion 42 extends perpendicularly away from the support surface 40 and has an outer plate portion 44 forming an upwardly obtuse angle with the outer edge of the inner plate portion 42. The collecting plates 36 may comprise any of the various embodiments disclosed in the aforementioned application for solar heat collecting units and a plurality of these collection plates 36 are mounted in spaced relationship to each other to cooperate in efficiently trapping and absorbing solar radiation in a manner so as to minimize radiative losses. Since substantially all of the solar radiation received by the collecting plates 36 is absorbed, the double and triple pane glass previously found necessary in prior art solar furnaces to prevent solar radiation from escaping the collector is no longer needed. Rather, a single pane of glass 38 can be used.

The conditioning air shown in FIG. 3 as dotted arrows 46 passes through the channels 48 defined in and between collecting plates 36 as best shown in FIG. 5. FIG. 9 shows the flow of the conditioning air 46 in greater detail. Conditioning air 46 enters a vertical delivery duct 50 at its lower base position 52 with part of the conditioning air traversing the entire length of the vertical delivery duct 50 and being delivered into an upper horizontal entry duct 54, both the vertical delivery duct 50 and the horizontal entry duct 54 have one side 56 and 58, respectively, open for uniform delivery of the conditioning air into the collecting plates 36. For clarity of description, the orientation of FIG. 1 is assumed and collector plates on the western, southern eastern and top surfaces of solar furnace 10 are designated as 36w, 36s, 36e and 36t, respectively. Likewise, conditioning air flow 46 and other appropriate elements will be similarly referenced.

Consider first conditioning air 46w emanating from the open side 56 of the vertical delivery duct 50. Conditioning air 46w is uniformly distributed in the plurality of collector plates 36w along the entire vertical surface of collecting unit 18w. The conditioning air 46w flows through the solar heat trapping channels 48w picking up trapped solar heat and then into correspondingly joining and abutting trapping channels 48s. The conditioning air, now termed 46s, continues on its uniform flow through collector unit 18s and into adjoining and correspondingly abutting channels, not shown, on collecting unit 18e. The conditioning air 46e transverses the collecting channels 48e and is collected in a vertical return duct 60 by passage through an open side 62.

In similar fashion, a portion of conditioning air 46 is uniformly distributed into the collecting plates 18t through the open side 58 of horizontal delivery duct 54 and the conditioning air 46t traverses the collecting unit 18t and is delivered into an open side 64 of a horizontal return duct 66. Conditioning air 46t joins the conditioning air 46e for delivery to the interior of the solar furnace 10 at collection point 68.

It is evident that the exiting conditioning air 46 from the collector units 18 at collection point 68 is substantially hotter than the conditioning air entering the vertical delivery duct 50 at entry point 52. This hot conditioning air is therefore ready to deliver heat to heat retaining material 80 in the storage chamber.

Conditioning air 46 is combined from collecting paths 46t and 46e for delivery into an upper screen duct 70 through an upward passageway 72 as shown in FIG. 11. The upper screen duct 70 comprises a longitudinally extending screen 74 having two semi-circular closed ends 76. The upper screen duct 70 rests on a support baffle 78 and is completely covered along its longitudinal extent by the heat retaiing material 80. It will be appreciated that the screen duct 70 is elevated relative to the collection point 68 so that after the hot air enters the screen duct 70 it is trapped in the storage chamber 94 in which the heat retaining material is confined due to the fact that hot air is lighter than relatively cool air.

Prior to entering the screen duct 70, the conditioning air enters a mixing chamber 82 which is in fluid communication with the collection point 68. In the present embodiment, the mixing chamber 82 is defined by an end wall 86 perpendicular to and in close fitting proximity to parallel baffles 78 and 79. Conventional angle supports 88, or any other conventional support, may be used to firmly affix the end wall 86 to the upper and lower baffles 78 and 79 respectively. The end wall 86 isolates the heat retaining material 80 from the mixing chamber 82. Side walls 90 of the mixing chamber 82 are similarly affixed and seen best in FIG. 10.

In FIGS. 4 and 8, the conditioning air 46 can be seen to exit from the upper screen duct 70 uniformly along its elongated arcuate upper screened surface 74 and into the surrounding heat retaining material 80. Due to a series of alternately spaced baffles 78 and 79, respectively, the conditioning air 46 weaves a downwardly reversing zigzag path passing uniformly through the heat retaining material and then finally exiting through the lower screen duct 92. It is evident that the conditioning air 46 has full and complete access to substantially all surfaces of the heat retaining material 80 within the storage chamber 94 of the solar furnace 10.

In the preferred form, the heat retaining material 80 is a granite rock having a diameter in the range of ¾ inches to 1½ inches so that the spaces between the rock particles are sufficient to allow the free flow of air through the storage chamber 94. The longitudinal screen mesh for the upper and lower screen ducts 70 and 92, respectively, is of smaller mesh size than the particle size of the gravel heat retaining material 80 so as to prevent the gravel heat retaining material 80 from falling into the ducts. It is obvious that any suitable heat retaining material can be used and that the size of the screen mesh can be varied accordingly.

FIG. 4 illustrates the detail flow of the conditioning air 46 within the storage chamber 94. The conditioning air 46 emerges from the longitudinally screened surface 74 of the upper screen duct 70 and is forced to follow a downwardly reversing path among and between the baffles 78 and 79. Baffles 78 are in parallel spaced relation to each other and are mounted to the inner surface of the rear wall 96. The remaining baffles 79 are in parallel spaced relation with each other and to baffles 78 and are mounted on the inner surface of the front wall 98 so as to extend between the baffles 78. Both sets of baffles 78 and 79 are mounted to the interior surfaces of the side walls 100. FIG. 5 illustrates one method of mounting the baffles 78 to front wall 98 and to side walls 100. In this regard all baffles 78 and 79 are firmly fixed on three ends with the remaining end 102 being in spaced relation to an opposing rear or front wall. Angle iron 104 is used in the present invention to firmly attach the baffle 78 to the front wall 98 and to the side wall 100. The angle iron 104 is diagrammatically shown in FIGS. 4, 5, and 11. The angle iron 104 may be affixed by any conventional means such as screw-type fasteners.

The downwardly reversing path which the conditioning air 46 follows causes the hot air to pass through the heat pretaining material 80 in such a manner as to come into contact pwith substantially all of the heat retaining material located within the storage chamber 94. It should be realized that the heat retaining material surrounding the upper screen duct 70 will normally be substantially hotter than the heat retaining material around the lower screen duct 92 since the conditioning air 46 becomes cooler as it passes downwardly through the storage chamber 94 loosing its heat to the heat retaining material. This, of course, is subject to the proviso that the conditioning air temperature as it comes from the collector units 18 is higher than the temperature of the heat retaining material 80 found within the storage chamber 94.

The conditioning air 46 exits the storage chamber 94 by uniformly entering the arcuate longitudinal screened surface of the lower screen duct 92. Referring now to FIG. 11, it will be seen that the conditioning air 46 is collected and forced through a blower 106 which is driven by motor 108 positioned rearwardly to the blower 106 and is driven through a lower exit duct 110 and then upwardly into the vertical delivery duct 50. The lower exit duct 110 operates in the same fashion as the mixing chamber 82 did at collection point 68. Thus, the cooler conditioning air 46, having given up its heat to the heat retaining material 80, seeks a lower level than corresponding hot air. This prevents the passage of any hotter air downward through the vertical deliery duct 50 and into the lower screen duct 92 when the blower 106 is not operating. This eliminates the need for expensive valve-like devices to prevent such air flow. The conditioning air 46 being forced by the blower 106 through the vertical deliery duct 50 is now ready for delivery into the collecting units 18 for beginning another cycle.

The conditioning air 46 intermittently recirculates in this fashion first passing over the collecting units 18 to become heated and then into the storage chamber 94 delivering that heat into the heat retaining material 80 found within the storage chamber 94 under the forcing pressure of the blower 106.

Utility Air Flow

FIGS. 2 and 11 show the utility blower 112 driven by motor 114 which forces the utility air 116 designated by arrows from a vertical utility deliery duct 118 into the building 12 via delivery pipe 24 for delivery into the conventional forced air heating system, not shown. It can, therefore, be appreciated that a circulating utility air flow 116 is established by means of a utility air blower 112 whereby hot air can be drawn, in a manner subsequently shown, from the storage chamber 94 and blown into the building structure 12 wherein it may be selectively diverted through various vent openings into desired locations in the building structure for heating.

Cool utility air 116 returns from the building structure 12 via return pipe 26 and into the return housing 34 as illustrated in FIGS. 2 and 7. The return housing 34 can be of any conventional structure that surrounds the return pipe 26 as it enters an upwardly extending inlet duct 120, FIG. 7. The return housing 34 insulates the storage chamber 94 from heat loss to the ground and prevents instrusion by insects, animals, and the like.

It is evident that since the return pipe 26 is below the bottom level of the storage chamber 94 and the delivery pipe 24 the need for an expensive valve is eliminated. Heat in the storage chamber 94 naturally rises and, therefore, hot air in the storage chamber 94 would not seek a path from the chamber 94 to the return pipe 26.

The returning cool utility air 116 is forced to follow an upwardly reversing path, FIG. 7, through the heat retaining material 80 until it reaches an exit duct 122. The utility air 116 as it passes through the heat retaining material 80 in the upward direction becomes increasingly hotter until at the exit duct 122 the utility air is at its maximum temperature. During delivery of utility air 116, the conditioning air blower 106 is normally inoperative and there is not conditioning air flow. However, hot air 124 from the upper regions of the storage chamber 94 can enter the utility air flow 116 as shown in FIG. 7. The utility air 116 passing through the exit duct 122, also shown in FIG. 11, is delivered through a vertical delivery duct 118 into the utlity air blower 112 and thence into the building 12. As will be appreciated by reference to FIGS. 7 and 11, the utility air 116 does not have the uniform flow through the heat retaining material 80 that the conditioning air 46 has. Essentially, the utility air 116 enters from a point source, i.e., the inlet duct 120, and exits into a point sink, i.e., the exit duct 122. The primary path followed by the utility air 116 is one that is upwardly reversing through the baffles 78 and 79 but which essentially follows a diagonal path direction 116a as shown in FIG. 11. Of course, as the utility air 116 travels the upwardly reversing diagonal path 116a dispersion 116b occurs causing greater access to the heat retaining material 80.

As the utility air 116 heats the building 12, there is a heat loss in the storage chamber 94. The greatest concentration of the heat loss occurs within the heat retaining material 80 positioned along the diagonal path 116a with its associated dispersion paths 116b. As this region of the heat retaining material 80 becomes cooler, inward convection indicated by arrows 116c will deliver heat from the outer regions of the heat retaining material 80 to the material along the diagonal path 116a. In this manner heat stored within the storage chamber 94 is depleted in a fairly uniform manner and delivered into the building 12.

Hot Utility Air Flow

Hot utility air flow is different from normal utility air flow in that hotter air is provided by the solar furnace 10 to the building 12 than provided by the normal utility air flow 116. This is illustrated in FIG. 6 and occurs when the conditioning air blower 106 and the utility air blower 112 are operating in the same time period. In this mode, the conditioning air 46 enters the storage chamber 94 from the upper screen duct 70 and is delivered after one reversing path directly into the vertical delivery duct 118 as hot utility air indicated by arrows 126. The hot utility air 126 is now delivered in the same manner as the utility air 116 into the building 12 and then redelivered for reheating through inlet duct 120 where it passes almost immediately into the lower screen duct 92 as conditioning air 46.

In this mode of air transfer, the bulk of the storage chamber 94 is bypassed. The conditioning air 46, as it enters from the collecting units 18, is delivered through the hottest portion of the storage chamber 94 and directly into the building 12 as hot utility air 126. This provides the building 12 with an initial surge of very hot air, such as is needed, for example, when initially warming the building up. Such air flow, of course, is not useful on overcast days or the like. The preferred method of heating is found in FIGS. 4 and 7 wherein the solar heat is first stored within the storage chamber 94 for later delivery into the building 12. The method as shown in FIG. 6, generates an initial surge of heat while the sun is directly on the solar furnace 10, but, as mentioned, is susceptible to cloud cover.

Other Structural Considerations

As best shown in FIG. 5, insulating panels 130 are used for isolating the collecting units 18 from the storage chamber 94. The framework for the storage chamber 94 includes three insulating rectangular panels 130 of substantially the same size which are interconnected along their longitudinal edges to form when connected to two insulating end panels an elongated housing of rectangular transverse cross-section with a closed top. A fourth similarly constructed rectangular panel 131 forms the bottom of the storage chamber 94 and is large enough to also form the bottom of the side collecting units 18w, 18s and 18e as best illustrated in FIG. 4. Each of the panels 130 and 131 is laminate with conventional plywood sheets on opposing faces with an inner relatively thick core of insulating material such as a rigid polyurethane foam. These panels are preferably painted or coated with a reflective paint such as silver paint to better retain heat within the storage chamber. The panels are interconnected in a conventional manner.

The solar reflective panels 16 are conventionally hinged to the edges of the bottom rectangular panel 131 to allow complete closure over the collecting units 18 in order to protect the single pane of glass 38 from detrimental environmental elements such as hail, sunlight in the summer months, and the like. The glass 38 receives structural support from dividers 132 which also reduces the cost of the glass due to the smaller glass panels used.

One feature in having spaced parallel baffles 78 and 79, in addition to providing uniform distribution of heat, is to uniformly and significantly reduce the lateral pressure on the side panels 130 of the solar furnace 10. FIG. 4 illustrates lateral side stress vectors 142 of the present invention. Generally, the weight of the heat retaining material 80 is uniformly distributed on the upper surface of each baffle 78 and 79. Each baffle is firmly affixed on three ends as previously discussed with the fourth end 102 being unsupported. The bulk of the weight of the heat retaining material 80, therefore, is absorbed by the side panels 130 where each baffle is firmly affixed. The side panel 130 opposite the open end 102 of a baffle also endures a stress as shown by stress vectors 142 since effectively two layers of heat retaining material 80 exert lateral side pressure on that portion of the side panel. In this manner, the heat retaining material 80 uniformly distributes corresponding lateral side wall pressure and vertical side wall pressure on the baffles 78 and 79.

Such a structural arrangement is a considerable advantage over a natural piling of heat retaining material 80 within the storage chamber 94. If no baffles were used, for example, the heat retaining material 80 would cause considerable lateral side pressure especially at the bottom of each side panel. Thus, in a natural pile configuration, considerable structural strength would have to be provided along the bottom edges of the side panels of the storage chamber 94.

Thus, in the present invention, the provision of parallel spaced alternating baffles 78 and 79 which provide uniform utility and conditioning air distribution to all surfaces of the heat retaining material 80 further lend considerable structural support to the storage chamber 94. The provision of these baffles provides uniform distribution of lateral side forces from the upper level to the lower bottom portion of the side walls.

Although the present invention has been described with a degree of certain particularity, it is understood that the present disclosure has been made by way of example, and that changes in detail of the structure may be made without departing from the spirit thereof.

What is claimed is:

1. An apparatus for generating heat from solar energy to heat a building comprising:
    a housing separate from the building and having at least one wall oriented in a substantially vertical position and at least one other wall in any position in substantially 90° increments relative to the vertical wall,
    a storage chamber defind substantially by the interior of said housing,
    heat retaining material substantially filling said storage chamber,
    means coextensive with the exterior surface of a plurality of said housing walls including the vertical wall for converting solar energy into heat, said converting means comprising a plurality of solar energy collecting and trapping plate members operatively mounted in spaced-apart and outward protruding relation from said housing walls, each of the plate members comprises an inner plate portion extending away from said housing walls and an outer plate portion extending at an obtuse angle from the inner plate portion, each pair of adjacent plate members collectively defining a substantially horizontal and parallel channel over said converting means, said plurality of plate members providing heat within the channels,
    first means for transferring heat from the channels of said converting means to said storage chamber,
    said heat retaining material being responsive to transferred heat for storing heat, and
    second means for transferring stored heat in said heat retaining material from said storage chamber to said building.

2. The apparatus of claim 1 wherein at least one housing wall is oriented in a substantially horizontal position.

3. The apparatus of claim 1 wherein said housing is of rectangular transverse cross-section in two mutually perpendicular vertical planes.

4. The apparatus of claim 1 wherein said storage chamber comprises a plurality of enclosing walls, and baffle means interspersed in said heat retaining material in substantially parallel spaced relation to each other for interconnecting the walls of said storage chamber, said baffles being supportive with said chamber walls of said storage chamber against the outward force of said heat retaining material.

5. The apparatus of claim 4 wherein said baffles are oriented in a substantially horizontal position, 6. The apparatus of claim 1 further comprising means in parallel spaced relation to said housing walls for insulating said collecting means from the environment and for passing solar energy therethrough to the plurality of plate members mounted on said housing wall, and wherein said first means for transferring heat from said converting means to said storage chamber comprises:
    conditioning fluid, and
    means for selectively propelling said conditioning fluid from said storage chamber through the plurality of channels of said converting means and back into said storage chamber in a recirculating path,
    said conditioning fluid being capable of absorbing heat when circulating in the channels of said converting means, said conditioning fluid being further capable of releasing heat to said heat retaining material when circulating in said storage chamber.

7. The apparatus of claim 6 wherein said second means for transferring stored heat in said heat retaining material from said storage chamber to said building comprises:
    utility fluid,
    means for selectively propelling said utility fluid from said storage chamber through said building and back into said storage chamber in a recirculating path, and
    said utility fluid being capable of absorbing stored heat from said heat retaining material when circulating in said storage chamber, said utility fluid being further capable of releasing heat to said building when circulating in said building.

8. The apparatus of claim 7 wherein said utility fluid and said conditioning fluid are intermixed in said storage chamber.

9. The apparatus of claim 8 wherein said means for propelling said utility fluid operates in a time sequence independent of the operation of said means for propelling said conditioning fluid.

10. The apparatus of claim 8 wherein said utility fluid propelling means and said conditioning fluid propelling means are capable of operating in the same time sequence.

11. The apparatus of claim 7 wherein said storage chamber comprises:
    top, bottom, and a plurality of side chamber walls interconnected for confining said heat retaining material,
    a plurality of baffles interspersed in said heat retaining material and oriented in substantially horizontal parallel spaced relation to each other,
    means for attaching said baffles to the interior surfaces of said side walls for directing said utility fluid and said conditioning fluid in reversing paths through said heat retaining material, and
    said baffles being supportive with said side walls against the outward force of said heat retaining material on said side walls.

12. A solar furnace apparatus for heating a building, said solar furnace being separate from said building and comprising, in combination:
    a framework of substantially rectangular configuration having outer surfaces, at least three of which are essentially vertical and the upper one of which is essentially horizontal, said framework defining an interior storage chamber,
    heat retaining material substantially filling said storage chamber,
    a solar heat collector integral with three of the outer vertical surfaces and with the upper horizontal surface of said framework for generating heat from impinging solar energy, said solar heat collector comprising a plurality of energy collecting and trapping plates operatively positioned at the outer surfaces of said framework in parallel and spaced-apart and outward protruding relation, each of said plate members comprising an inner plate portion extending away from the surface of said framework and an outer portion extending at an obtuse angle from the inner plate portion, the spaced-apart relationship of adjacent pairs of plate members defining a channel therebetween, means in parallel spaced relation to said surfaces of said collector for insulating said solar heat collector from the environment, said insulating means being able to pass solar enegy therethrough, means for circulating heat transfer fluid through substantially all of the channels of said collector and through said heat retaining material to transfer heat between said collector and said heat retaining material, and means for circulating heat transfer fluid through said heat retaining material and said building to transfer heat between said solar furnace and said building.

13. The solar furnace of claim 12 wherein said housing comprises side walls which define said storage chamber, and further comprising a series of substantially horizontal baffles in parallel spaced relation to each other, said series of baffles being connected to the interior surfaces of the side walls of said storage chamber to conduct said fluid in a reversing path to contact substantially all of said heat retaining material.

14. The solar furnace of claim 13 wherein said horizontal baffle members extend alternatively along the vertical extent of said storage chamber rearwardly from the front sidewall of said storage chamber and forwardly from the rear sidewall of said storage chamber.

15. The solar furnace of claim 13 wherein each of said baffles is connected to any three of the four side walls of said storage chamber for supporting said side walls against the outward force of said heat retaining material.

16. The solar furnace of claim 12 wherein said means for circulating said fluid through said collector and said heat retaining material comprises:
a conditioning inlet to said storage chamber,
an outlet from said collector, the outlet from said collector being at a lower position within said solar furnace than said conditioning inlet to said storage chamber,
means for connecting in fluid communication said conditioning inlet to said collector outlet,
a conditioning outlet from said storage chamber,
an inlet to said collector, the inlet to said collector being at a lower position within said solar furnace than said conditioning outlet from said storage chamber,
means for connecting in fluid communication said conditioning outlet to said collector inlet, and
a pump for propelling said fluid.

17. The solar furnace of claim 12 wherein said means for circulating said fluid through said heat retaining material and said building comprises:
a utility inlet to said storage chamber,
an outlet from said building,
means for connecting in fluid communication said utility inlet to said building outlet,
a utility outlet from said storage chamber,
a utility inlet into said building,
means for connecting in fluid communication said utility outlet to said building inlet, and
a pump for propelling said fluid.

18. The solar furnace of claim 12 wherein said insulating means comprises a single pane of glass.

19. A solar furnace as recited in claim 12 wherein said means for circulating heat transfer fluid through said collector and said heat retaining material further passes the heat transfer fluid substantially horizontally through the channels of said solar heat collector.

20. A method of heating a building with heat derived from solar energy impinging on a solar furnace spaced from said building comprising the steps of:
absorbing solar heat on a collector having one surface oriented in a vertical position and at least one other surface oriented in substantially 90° increments relative to the vertical surface,
positioning a plurality of solar energy collecting and trapping plate members at each surface of said solar collector to extend outward therefrom,
positioning the plurality of solar energy collecting and trapping plate members in essentially parallel and spaced-apart relation,
extending an outer portion of each of said plate members at an obtuse angle with respect to an inner portion of the plate member adjacent the surface of said solar collector,
locating heat retaining material in a storage chamber in the interior of said solar furnace,
intermittently circulating a conditioning fluid through the spaces between adjacent pairs of plate members and through the heat retaining material, and
intermittently circulating a utility fluid through the heat retaining material and the building.

21. The method of claim 20 wherein said step of absorbing heat further comprises the step of absorbing solar heat on at least one collector surface oriented in a substntially horizontal position.

22. The method of claim 20 wherein said step of absorbing heat further comprises the steps of:
absorbing solar heat on at least one collector surface oriented in a substantially vertical position, and
absorbing solar heat on at least one collector surface oriented in a substantially horizontal position.

23. The method of claim 20 wherein the step of intermittently circulating conditioning fluid further comprises the steps of:
intermittently propelling the conditioning fluid with a pump,
passing the conditioning fluid through an outlet in the storage chamber and downwardly through an inlet to the solar collector, said storage chamber outlet being positioned at a higher elevation that said solar collector inlet,
directing the conditioning fluid over substantially all of the heat collecting surface of the solar collector, and
passing the conditioning fluid through an outlet in the solar collector and upwardley through an inlet to the storage chamber, said solar collector outlet being positioned at a lower elevation than said storage chamber inlet.

24. The method of claim 23 wherein said conditioning fluid is passed through a series of reversing bends as it passes through the heat retaining material.

25. The method of claims 20 wherein the step of intermittently circulating a utility fluid through the heat retining material and the building further comprises the steps of:
intermittently propelling the utility fluid with a pump, passing the utility fluid through an outlet in the storage chamber and downwardly through an inlet to the building, said storage chamber outlet being positioned at a higher elevation than said building inlet, directing the utility fluid into a heating distribution system of said building, and passing the utility fluid through an outlet in the building and upwardly through an inlet to the storage chamber, said building outlet being positioned at a lower elevation than said storage chamber inlet.

26. The method of claim 25 wherein said utility fluid is passed through a series of reversing bends as it passes through the heat retaining material.

* * * * *